United States Patent [19]
Ehrhardt et al.

[11] Patent Number: 5,154,897
[45] Date of Patent: Oct. 13, 1992

[54] METHOD AND APPARATUS FOR THE GENERATION OF RADIOISOTOPES

[75] Inventors: Gary J. Ehrhardt, Columbia, Mo.; Robert K. Guimon, Las Vegas, Nev.; Kurt R. Zinn, Columbia; Steven Symes, Town & Country, both of Mo.

[73] Assignee: University of Missouri, Columbia, Mo.

[21] Appl. No.: 665,331

[22] Filed: Mar. 6, 1991

[51] Int. Cl.$^5$ .............................................. C22B 59/00
[52] U.S. Cl. ........................................ 423/6; 423/249; 250/432 PD; 210/660; 210/805; 210/807; 252/645
[58] Field of Search .............. 250/432 PD; 204/157.2; 423/2, 6, 249; 252/645; 424/1.1; 210/660, 805, 807

[56] References Cited

U.S. PATENT DOCUMENTS

| | | | |
|---|---|---|---|
| 3,774,036 | 11/1973 | Gerhart | 250/432 PD |
| 4,039,835 | 8/1977 | Colombetti | 250/432 PD |
| 4,330,507 | 5/1982 | Lewis | 423/2 |
| 4,414,145 | 11/1983 | Panek | 252/645 |

Primary Examiner—Brooks H. Hunt
Assistant Examiner—Ngoclan T. Mai
Attorney, Agent, or Firm—Senniger, Powers, Leavitt & Roedel

[57] ABSTRACT

A method and a generator for separating daughter radioisotope from a stock solution containing the daughter radioisotope and its parent are provided. The generator is provided with a glass adsorbent which preferentially adsorbs daughter radioisotope relative to the parent radioisotope and circulation means for withdrawing the stock solution from a reservoir, contacting the solution with the glass adsorbent to adsorb the daughter radioisotope and returning the parent radioisotope-enriched solution to the reservoir. In the process stock solution containing daughter radioisotope having a predetermined pH is contacted with the glass adsorbent to selectively adsorb the daughter radioisotope thereon and the daughter radioisotope is eluted with an eluant at a second predetermined pH. The process also includes a step of washing the glass adsorbent with a wash solution at the first predetermined pH to remove traces of the parent radioisotope from the adsorbent prior to eluting the daughter radioiotope. In the process the first predetermined pH is in the range of from 4.0 to 10.0 and the second predetermined pH is less than 4. Daughter radioisotopes such as Y-90, Ga-68 and Ca-47 can be separated from their parents using these process and generator.

17 Claims, 1 Drawing Sheet

METHOD AND APPARATUS FOR THE GENERATION OF RADIOISOTOPES

BACKGROUND OF THE INVENTION

This invention relates to a system for generating daughter radioisotopes, and more particularly to an apparatus and method for the production of daughter radioisotopes from solutions containing mixtures of parent radioisotopes and daughter radioisotopes.

Radioisotopes are commonly used for research, treatment and diagnosis in the field of nuclear medicine. Such applications include liver, lung, bone and tumor scanning. Other applications are radiotherapeutic. Radioisotopes are also used in industrial environments for process control, radiometric chemistry and the like. It is desirable to generate daughter radioisotopes with a minimum of metallic, organic and other impurities for such industrial, diagnostic and radiotherapeutic purposes.

Radioisotope generator systems for applications in the field of nuclear medicine should provide convenient on-site production of short-lived daughter radioisotopes with a high specific activity. It is desirable to produce a daughter radioisotope in high yield and minimize breakthrough, i.e. contamination with the parent radioisotope. Other contaminants such as organic radiolysis products and metal ions should also be avoided.

Parent/daughter systems employed or investigated in connection with nuclear medicine include Mo-99/Tc-99m, Sr-90/Y-90, Ge-68/Ga-68, and Ca-47/Sc-47 among others.

One currently available method of producing daughter radioisotopes from parent/daughter solutions employs ion exchange resin such as Dowex 50. The organic columns of such systems, however, are subject to radiation damage. Therefore such generator systems suffer from short usable life, limited scale-up potential, and possible contamination of the daughter product with organic radiolysis product.

Various solvent extraction methods are also used to produce daughter radioisotopes. Disadvantageously, though, solvent extraction methods are complicated and typically produce volumes of liquid organic waste contaminated with the parent radioisotope. Due to the employment of strong chelating agents, solvent extraction methods can result in daughter product solutions contaminated with extraneous metal ions from reagents and other sources.

It is also known to generate daughter radioisotopes in systems based on alumina or stannic oxide columns. A major disadvantage of such systems, though, is the potential leaching of metal ions from the metallic oxide column during acid-elution of the daughter product from the column. The presence of metal ions in the daughter product solution compromises the quality of the solution and can render it worthless.

Accordingly, a need has existed for a method and apparatus for the environmentally-safe generation of daughter radioisotopes which provide convenient on-site production of short-lived daughter radioisotopes with a high specific activity. The need for such a method and apparatus has existed which results in a daughter radioisotope in high yield with a minimum of breakthrough of the parent radioisotope whereby the potential for metallic, organic or other contamination in the daughter product is minimized.

SUMMARY OF THE INVENTION

Among the several objects of the invention, therefore, is the provision of a novel method for the generation of daughter radioisotopes suitable for use in industrial and nuclear medicine applications; the provision of such a method which produces short-lived daughter radioisotopes of high specific activity; the provision of such a method which produces daughter radioisotopes in high yield with a minimum of breakthrough contamination by the parent radioisotope; the provision of such a method which does not employ metallic oxide columns which can potentially contaminate the daughter product solution; the provision of such a method which does not employ organic ion exchange media which can potentially contaminate the daughter product solution; the provision of such a method which does not collaterally produce large volumes of liquid organic waste bearing radioactive parent radioisotope; the provision of such a method which can be readily scaled up to commercial dimensions; the provision of such a method which does not employ strong chelating agents; the provision of such a method which is particularly suitable for the generation of Y-90; the provision of such a method which is particularly suitable for the generation of Ga-68; the provision of such a method which is particularly suitable for the generation of Sc-47; the provision of an apparatus useful in carrying out the foregoing methods; the provision of a solution bearing Y-90 radioisotope, the solution being suitable for use in industrial and nuclear medicine procedures; the provision of a solution bearing Ga-68 radioisotope, the solution being suitable for use in industrial and nuclear medicine procedures, the provision of a solution bearing Sc-47 radioisotope, the solution being suitable for use in industrial and nuclear medicine procedures.

Briefly, therefore, the invention is directed to a generator apparatus for eluting a daughter radioisotope from a parent radioisotope. The apparatus comprises a reservoir for holding a supply of parent radioisotope and daughter radioisotope, a glass adsorbent which, at a first predetermined pH, preferentially adsorbs the daughter radioisotope relative to the parent radioisotope and from which the daughter radioisotope can be eluted at a second predetermined pH, and a source of eluant at the second predetermined pH for eluting the daughter radioisotope from the glass adsorbent. The apparatus additionally comprises a circulation means for withdrawing a solution containing the parent and daughter radioisotopes from the reservoir, contacting the solution with the glass adsorbent whereby the daughter radioisotope will be adsorbed by the adsorbent and the solution is enriched in parent radioisotope, and thereafter returning the parent radioisotope-enriched solution to the reservoir.

The invention is further directed to a process for separating a daughter radioisotope from a stock solution containing the daughter radioisotope and its parent radioisotope. The stock solution has a first predetermined pH and concentration of daughter radioisotope such that the daughter radioisotope is in solution. The process comprises providing a glass adsorbent which, at the first predetermined pH, preferentially adsorbs the daughter radioisotope relative to the parent radioisotope and from which the daughter radioisotope can be eluted at a second predetermined pH. The process further comprises contacting the stock solution at the first predetermined pH with the glass adsorbent to adsorb the daughter radioisotope thereon, and eluting the daughter radioisotope with an eluant at the second predetermined pH.

The invention is further directed to a process for separating a Y-90 radioisotope from a stock solution containing the Y-90 radioisotope and Sr-90 radioisotope, the stock solution having a pH in the range of 4.5 to 10.5 and concentration of Y-90 radioisotope such that the Y-90 radioisotope is in solution. The process comprises providing a glass adsorbent which, at the pH of the stock solution, preferentially adsorbs the Y-90 radioisotope relative to the Sr-90 radioisotope and from which the Y-90 radioisotope can be eluted by an eluant at a pH below 4.5, contacting the stock solution with the glass adsorbent to adsorb the Y-90 radioisotope thereon, and eluting the Y-90 radioisotope with the eluant.

DESCRIPTION OF THE PREFERRED EMBODIMENT

Figure 1:
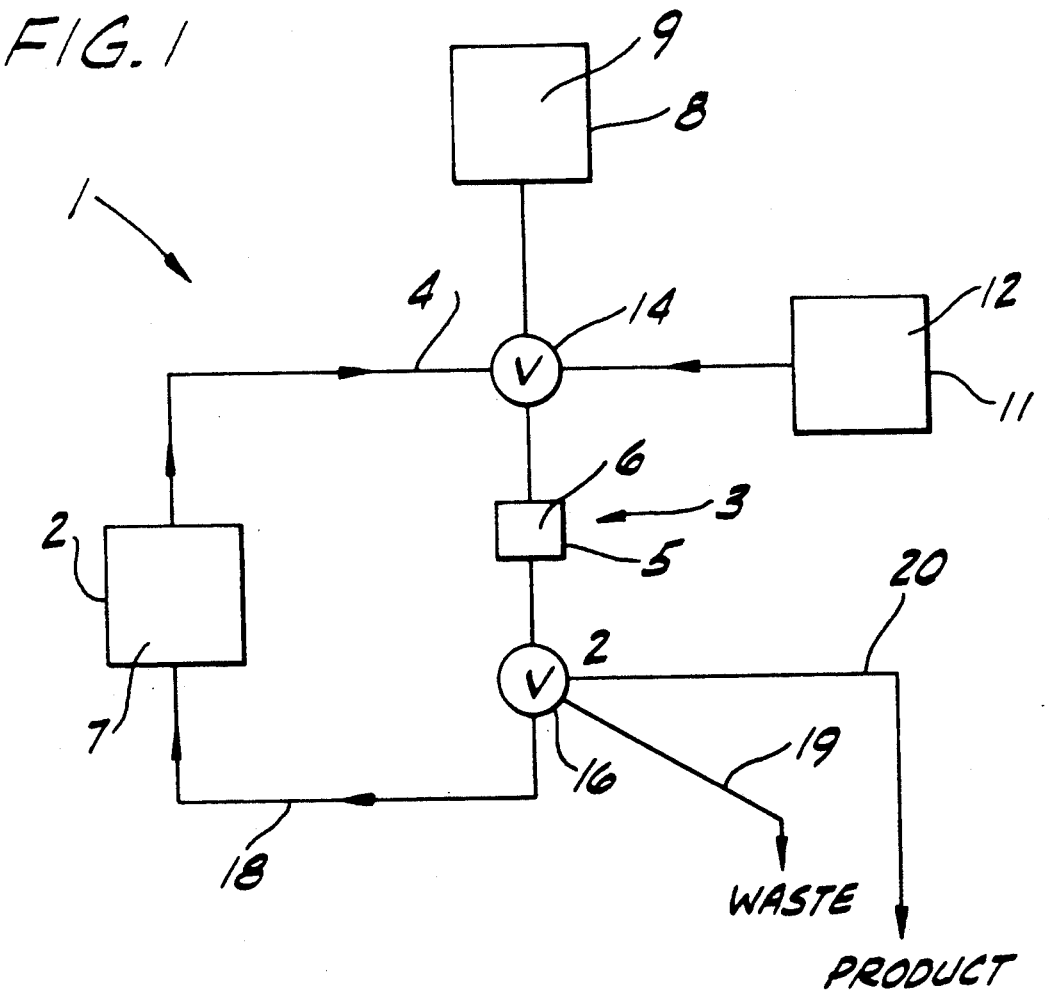
FIG. 1 is a schematic representation of the apparatus in accordance with this invention.

In accordance with the present invention, it has been discovered that parent and daughter radioisotopes may be quantitatively separated through the use of a glass adsorbent which preferentially adsorbs the daughter relative to its parent at a first predetermined pH and from which the daughter can be eluted using an eluant at a second predetermined pH. Without being bound to any theory, it is presently believed that the mechanism by which the daughter is adsorbed is at least analogous to, if not controlled by, the principles of Fajans adsorption. According to the principles of Fajans adsorption, conditions which favor the precipitation of a substance present in macro amounts also tend to favor the coprecipitation of the same substance present in low concentrations with a foreign substance; the precipitating foreign substance in effect forces the coprecipitating species present in low concentrations out of solution.

Unlike conventional Fajans adsorption, no precipitating foreign substance is required in accordance with the present invention and apparatus of the present invention. Instead, it is presently believed that hydroxyl groups on the surface of a glass adsorbent rich in hydroxyl groups interact with the daughter radioisotope thereby causing a preferential adsorption of the daughter relative to its parent at a first predetermined pH. Thus, when a source solution containing a parent isotope and a low concentration of daughter radioisotope is contacted with the glass adsorbent, the daughter radioisotope is preferentially adsorbed and the concentration of parent isotope in the source solution is enriched. The daughter product thus retained by the glass adsorbent can be removed therefrom through the use of an eluant at a second predetermined pH, e.g., by acid-washing it from the glass adsorbent in a subsequent step.

Parent/daughter mixtures suitable for treatment by the method of this invention include Sr-90/Y-90, Ge-68/Ga-68, and Ca-47/Sc-47 among others. Each of these parent/daughter mixtures are characterized by daughter concentrations which, at neutral pH, are well below the applicable solubility products. Precipitative removal of daughter product from such solutions is, therefore, not always commercially practical.

It is known that Ge, Sr and Ca in macro amounts are relatively soluble at neutral pH, while their respective daughter products, Ga, Y and Sc, in macro amounts, tend to precipitate as hydroxides. The hydroxide solubility products of Ga, Y and Sc are $7.1 \times 10^{-36}$, $5.2 \times 10^{-22}$, and $1.0 \times 10^{-28}$, respectively, at 25° C. A.M. Dymov and A.P. Savostin, Analytical Chemistry of Gallium (Ann Arbor Science Publishers, Ann Arbor, 1970) p. 10. P.C. Stevenson and W.E. Nervik, "The Radiochemistry of the Rare Earths, Scandium, Yttrium, and Actinium," National Academy of Sciences-National Research Council Nuclear Science Series, NAS-NS-3020, Technical Information Center, Oak Ridge, Tenn. (1972), p. 17.

Turning now to FIG. 1, at reference numeral 1 is a schematic representation of a novel generator apparatus adapted for carrying out the method of this invention. Reservoir 2 is constructed of polyethylene, other plastics, silated glass or other suitable material which does not significantly adsorb radioisotopes. Reservoir 2 contains the stock solution 7 of parent and daughter radioisotopes from which the daughter radioisotope is separated according to the method of the invention. The stock solution is circulated from reservoir 2 through conduit 4 toward bed 3. Conduit 4 has a tubular shaped and is constructed of polyethylene, other plastics, silated glass or other suitable material. Container 5 and glass adsorbent 6 therein form bed 3. Container 8 contains wash solution 9 which is preferably aqueous and maintained at a pH approximately the same as the stock solution. Container 11 contains eluant 12 which comprises hydrochloric, nitric or other suitable acid maintained at a pH below at least about 4.0. Valve 14 is adjustable to selectively permit flow therethrough of stock solution, wash solution or eluant toward bed 3. Valve 16 is adjustable to selectively direct the flow out of bed 3 toward into recycle conduit 18, waste conduit 19 or product conduit 20. Not shown are suitable pumping mechanisms to effect the flow of solutions through the apparatus.

Various forms of glass adsorbent may be used in the generator apparatus. The adsorbent may be glass microspheres, glass wool, a glass tube or other glass structure. Etching of the glass adsorbent with hydrofluoric acid or other suitable etchant improves the results due to an increase in adsorbent surface area and therefore available surface hydroxyl groups. Etching also activates the surface of the adsorbent resulting in an increase in affinity of the adsorbent for the daughter radioisotope.

The glass adsorbent is preferably provided as a bed of glass microspheres having a diameter in the range of from about 70 to about 110 microns. The adsorbent may comprise Pyrex, soda lime glass, etched glass or other glass material.

Generally, the method of this invention involves supplying a stock solution 7 in reservoir 2 which contains a mixture of parent and daughter radioisotope. The pH of the stock solution is adjusted to a first predetermined pH at which the daughter radioisotope is determined to be preferentially adsorbed relative to the parent radioisotope by the glass adsorbent 6. This pH adjustment may occur internally or externally of the reservoir 2. Stock solution 7 is withdrawn from reservoir 2 by means of a pumping mechanism not shown in FIG. 1 and transferred through conduit 4 in the direction of the arrow to bed 3. The stock solution is contacted with glass adsorbent 6 contained in bed 3 for a sufficient time to permit adsorption of the daughter radioisotope onto the glass adsorbent. Thereafter, the adsorbent is rinsed using wash solution 9 at the first predetermined pH to remove any remaining solution containing the parent isotope from the adsorbent. After contacting the adsorbent, the wash solution may be returned to the reservoir to allow for the growth of another crop of daughter product from the parent radioisotope remaining in solution. The glass adsorbent is then separately rinsed with eluant 12 at a second predetermined pH to elute the daughter radioisotope from the adsorbent. The eluted daughter radioisotope solution may optionally be recirculated through bed 3 to achieve further separation of daughter from components in the stock solution.

As indicated above, the treatment of the stock solution involves adjustment of the stock solution to a first predetermined pH. The pH chosen is a function of the hydroxide solubility products of the daughter and parent radioisotope. The hydroxide solubility products of parent radioisotopes treatable by the method of this invention are higher than the hydroxide solubility products their companion daughter radioisotopes. It is preferable that the stock solution be in a pH range which corresponds to a hydroxide parent radioisotope concentration product well below its solubility product to minimize precipitation of parent radioisotope. The pH of the stock solution, however, must be high enough to permit preferential adsorption of the daughter product by a mechanism similar to Fajans adsorption. By staying below the parent hydroxide solubility Product, the danger of contamination of the product solution with precipitates of the longer-lived parent radioisotope is minimized. If the pH is too low, however, the daughter product remains in solution and may not sorb onto the glass adsorbent. For the parent/daughter system comprising Ge-68/Ga-68, a stock solution pH in the range of 5 to 9 has been discovered to be low enough to prevent precipitation of the germanium hydroxide yet high enough to permit adsorbtion of the daughter product. For the parent/daughter system of Sr-90/Y-90, a pH of 7 is preferred. The pH resulting in optimal recovery for each of several parent/daughter systems appropriate for treatment with this invention will be different depending on the solubility characteristics of each radioisotope.

Recovery of the daughter radioisotope is achieved by passing an eluant of a pH lower than that of the stock solution over the glass adsorbent. The eluant pH must be sufficiently low to solubilize the daughter radioisotopes and thus elute them from the adsorbent. For the parent/daughter systems of Sr-90/Y-90 and Ge-68/Ga-68, an eluant pH below 4.5 is preferred.

EXAMPLE 1

A stock solution (10 ml.) containing about 0.1 microcurie of Ge-68 and of Ga-68 daughter radioisotope decay product was adjusted to a pH of 7 by the addition of NaOH. The solution was passed through a 0.8 cc bed of glass microspheres. Air pressure was provided to force the solution through the bed. Stock solution which has passed through the bed may be recycled for the recovery of more daughter radioisotope resulting from further decay of the parent radioisotope. Ten ml. of water, also at a pH of 7, was then passed through the bed to remove by washing away any traces of parent Ge-68 in droplets of solution which may have been mechanically retained in the bed. Ten ml. of 1M HCl was then passed through the bed to elute the Ga-68 daughter radioisotope retained by the bed. The process was also performed for stock solutions adjusted to pHs of 5 and 9. In an optional additional step, the eluate was then brought to a pH of 7 by the addition of NaOH. The neutral solution was then passed over the bed again as the above process was repeated to further decontaminate the daughter radioisotope, i.e. minimize the "breakthrough" of parent Ge-68 into the Ga-68 daughter product solution.

Gallium-68 yield and Ge-68 breakthrough were determined by gamma spectroscopy of the 511 keV position annihilation peak using a germanium detector and multichannel analyzer system immediately after elution and the following day, respectively. The following results were obtained:

| Volume of Adsorbent (cc) | Stock pH | Eluant | Number of Trials | Average Breakthrough (%) | Average Yield (%) |
|---|---|---|---|---|---|
| 0.4 | N/A | 3M HCl | 3 | 0.055 | 64.25 |
| 0.8 | N/A | 3M HCl | 1 | 0.050 | 73.00 |
| 0.8 | 5 | 3M HCl | 4 | 0.307 | 68.86 |
| 0.8 | 7 | 1M HCl | 4 | 0.293 | 54.50 |
| 0.8 | 9 | 3M HCl | 4 | 0.493 | 47.90 |
| 0.4 | N/A | 3M HCl | 1 | 0.066 | 34.20 |
| 0.8 | 7 | 1M HCl | 2 | 0.040 | 74.32 |

When the eluted solution was brought to neutral pH and the process of the invention was repeated, the following results were obtained:

| Volume of Adsorbent (cc) | Stock pH | Eluant | Breakthrough (%) | Yield (%) |
|---|---|---|---|---|
| 1st Separation 0.8 | 7 | 1M HCl | N/A | 73.85 |
| 2nd Separation 0.8 | 7 | 3M HCl | 0.047 | 35.29 |

EXAMPLE 2

A solution containing 4.0 micrograms of Y-90 was processed in the same manner as outlined in Example 1. Yttrium-90 yield was determined by liquid scintillation counting of a portion of the eluate. Strontium-90 breakthrough was determined by gamma spectroscopy of the 514 keV peak of Sr-85 tracer in the stock and daughter product solutions. The following results were obtained:

| Volume Adsorbent (cc) | Separation Time (min) | Eluant | Breakthrough (%) | Yield (%) |
|---|---|---|---|---|
| 0.8 | 2 | 3M HCl | 0.096 | 29.36 |
| 0.8 | 5 | 3M HCl | 0.104 | 31.59 |
| 1.6 | 3 | 3M HCl | 0.740 | 18.10 |
| 0.6 | 3 | 3M HCl | 0.055 | 19.32 |

When the optional step of bringing the eluted solution to neutral pH and repeating the process of the invention was performed, the following results were obtained:

| Volume Adsorbent (cc) | Stock pH | Eluant | Breakthrough (%) | Yield (%) |
|---|---|---|---|---|
| 0.6 | 7 | 1M HCl | N/A | 39.04 |
| 0.6 | 7 | 1M HCl | 0.0076 | 34.41 |
| 0.6 | 7 | 1M HCl | N/A | 22.70 |
| 0.6 | 7 | 1M HCl | 0.0060 | 16.55 |

What is claimed is:

1. A generator apparatus for separating a daughter radioisotope from a parent radioisotope, the apparatus comprising:

a reservoir for holding a stock solution containing parent radioisotope and daughter radioisotope, a glass adsorbent which, at a first predetermined pH, preferentially adsorbs the daughter radioisotope relative to the parent radioisotope and from which the daughter radioisotope can be eluted at a second predetermined pH, a source of eluant at the second predetermined pH for eluting the daughter radioisotope from the glass adsorbent, and circulation means for withdrawing said stock solution containing the parent and daughter radioisotopes from the reservoir, contacting the solution with the glass adsorbent whereby the daughter radioisotope will be adsorbed by the adsorbent and the solution is enriched in parent radioisotope, and thereafter returning the parent radioisotope-enriched solution to the reservoir.

2. The generator apparatus as set forth in claim 1 additionally comprising a source of wash solution at said first pH for removing traces of said parent radioisotope mechanically retained by said adsorbent prior to elution of said daughter radioisotope.

3. The generator apparatus as set forth in claim 1 wherein said glass adsorbent comprises microspheres.

4. A process for separating a daughter radioisotope from a stock solution containing the daughter radioisotope and its parent radioisotope, the stock solution having a first predetermined pH and concentration of daughter radioisotope such that the daughter radioisotope is in solution, the process comprising:

providing a glass adsorbent which, at the first predetermined pH, preferentially adsorbs the daughter radioisotope relative to the parent radioisotope and from which the daughter radioisotope can be eluted at a second predetermined pH, contacting the stock solution at the first predetermined pH with the glass adsorbent to adsorb the daughter radioisotope thereon, and eluting the daughter radioisotope with an eluant at the second predetermined pH.

5. The process as set forth in claim 4 comprising an additional step of washing said glass adsorbent with a wash solution at said first predetermined pH to remove traces of said parent radioisotope from said adsorbent prior to eluting said daughter radioisotope.

6. The process as set forth in claim 4 wherein said first predetermined pH is in the range from 4.0 to 10.0.

7. The process as set forth in claim 6 wherein said first predetermined pH is in the range from 5.0 to 9.0

8. The process as set forth in claim 4 wherein said stock solution is recycled after contacting said absorbent.

9. The process as set forth in claim 4 wherein said second predetermined pH is less than 4.0.

10. The process as set forth in claim 4 wherein said daughter radioisotope comprises Y-90 and said parent radioisotope comprises Sr-90.

11. The process as set forth in claim 4 wherein said daughter comprises Ga-68 and said parent radioisotope comprises Ge-68.

12. The process as set forth in claim 4 wherein said parent radioisotope comprises Ca-47 and said daughter radioisotope comprises Sc-47.

13. The process as set forth in claim 9 wherein said eluant comprises hydrochloric acid.

14. The process as set forth in claim 4 wherein said glass adorbent comprises glass microspheres.

15. The process as set forth in claim 14 wherein said glass microspheres have a diameter in the range of from about 70 to about 110 microns.

16. A process for separating a Y-90 radioisotope from a stock solution containing the Y-90 radioisotope and Sr-90 radioisotope, the stock solution having a pH in the range of 4.5 to 10.5 and concentration of Y-90 radioisotope such that the Y-90 radioisotope is in solution, the process comprising:

providing a glass adsorbent which, at the pH of the stock solution, preferentially adsorbs the Y-90 radioisotope relative to the Sr-90 radioisotope and from which the Y-90 radioisotope can be eluted by an eluant at a pH below 4.5, contacting the stock solution with the glass absorbent to adsorb the Y-90 radioisotope thereon, and eluting the adsorbed Y-90 radioisotope from the adsorbent with the eluant.

17. The method as set forth in claim 16 wherein said glass adsorbent comprises microspheres.

* * * * *

UNITED STATES PATENT AND TRADEMARK OFFICE
CERTIFICATE OF CORRECTION

PATENT NO. : 5,154,897

DATED : October 13, 1992

INVENTOR(S) : Gary J. Ehrhardt et al.

It is certified that error appears in the above-identified patent and that said Letters Patent is hereby corrected as shown below:

Column 8 claim 4, lines 1-2, "eluting the daughter radioisotope with an eluant at the second predetermined pH" should read -- eluting the adsorbed daughter radioisotope from the adsorbent with an eluant at the second predetermined pH- -.

Column 8, claim 11, line 21, "daughter comprises" should read ---daughter radioisotope comprises- -.

Signed and Sealed this

Twenty-sixth Day of October, 1993

*Attest:*

BRUCE LEHMAN

*Attesting Officer*     *Commissioner of Patents and Trademarks*

UNITED STATES PATENT AND TRADEMARK OFFICE
CERTIFICATE OF CORRECTION

PATENT NO. : 5,154,897

DATED : October 13, 1992

INVENTOR(S) : Gary J. Ehrhardt et al.

It is certified that error appears in the above-identified patent and that said Letters Patent is hereby corrected as shown below:

Column 1, line 3,

"This Invention was made with government support under Grant No. 90-145-PHY-89-00317 awarded by the National Science Foundation. The government has certain rights in the Invention."

Signed and Sealed this

Twenty-seventh Day of February, 1996

Attest:

BRUCE LEHMAN

*Attesting Officer*    *Commissioner of Patents and Trademarks*